(12) United States Patent
McKinzie et al.

(10) Patent No.: US 10,442,455 B2
(45) Date of Patent: Oct. 15, 2019

(54) STOWABLE STEERING WHEEL ASSEMBLY

(71) Applicants: Todd McKinzie, Goodrich, MI (US); Marco R Cercone, Troy, MI (US)

(72) Inventors: Todd McKinzie, Goodrich, MI (US); Marco R Cercone, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 127 days.

(21) Appl. No.: 15/686,306

(22) Filed: Aug. 25, 2017

(65) Prior Publication Data

US 2018/0079441 A1    Mar. 22, 2018

Related U.S. Application Data

(60) Provisional application No. 62/396,316, filed on Sep. 19, 2016.

(51) Int. Cl.
    *B62D 1/183*      (2006.01)
    *B62D 1/04*      (2006.01)
    *B62D 1/181*      (2006.01)

(52) U.S. Cl.
    CPC ............... *B62D 1/183* (2013.01); *B62D 1/04* (2013.01); *B62D 1/181* (2013.01)

(58) Field of Classification Search
    CPC . B62D 1/04; B62D 1/18; B62D 1/181; B62D 1/183; B62D 1/185
    See application file for complete search history.

(56) References Cited

U.S. PATENT DOCUMENTS

| | | | | |
|---|---|---|---|---|
| 1,168,958 A | * | 1/1916 | Neville | B62D 1/04 74/554 |
| 3,368,422 A | * | 2/1968 | Walter | B62D 1/04 180/78 |

(Continued)

FOREIGN PATENT DOCUMENTS

| | | |
|---|---|---|
| DE | 102006006995 A1 | 8/2007 |
| EP | 0802105 A2 | 10/1997 |

(Continued)

OTHER PUBLICATIONS

International Search Report and Written Opinion dated Dec. 8, 2017 for International Application No. PCT/US2017/049246, International Filing Date Aug. 30, 2017.

*Primary Examiner* — Frank B Vanaman
(74) *Attorney, Agent, or Firm* — Ralph E Smith

(57) ABSTRACT

A steering assembly movable between a deployed position and a stowed position in an instrument panel of a vehicle includes a mounting sled assembly configured to mount to a structural portion of the vehicle, a movable sled assembly operably coupled to the mounting sled assembly and movable relative thereto, the movable sled assembly movable between a retracted position where the movable sled assembly is disposed within the instrument panel, and a deployed position where the movable sled assembly is extended away from the instrument panel toward a rear of the vehicle, and a handle assembly configured to move between a stowed position where the handle assembly is at least partially retracted within the movable sled assembly, and a deployed position where at least a portion of the handle assembly extends outward from the movable sled assembly for a driver to manipulate and steer the vehicle.

15 Claims, 9 Drawing Sheets

(56) References Cited

U.S. PATENT DOCUMENTS

| | | | | |
|---|---|---|---|---|
| 3,548,128 A | * | 12/1970 | Willett | B60K 37/00 |
| | | | | 200/61.57 |
| 5,178,411 A | * | 1/1993 | Fevre | B62D 1/181 |
| | | | | 280/775 |
| 6,070,686 A | * | 6/2000 | Pollmann | B60R 25/0221 |
| | | | | 180/287 |
| 7,862,084 B2 | | 1/2011 | Maeda et al. | |
| 2003/0146040 A1 | * | 8/2003 | Dybalski | B62D 1/12 |
| | | | | 180/446 |
| 2014/0260761 A1 | | 9/2014 | Soderlind | |
| 2016/0121917 A1 | * | 5/2016 | Bonfante, Jr. | B60K 20/06 |
| | | | | 74/473.2 |
| 2016/0347348 A1 | * | 12/2016 | Lubischer | B62D 1/181 |

FOREIGN PATENT DOCUMENTS

| | | |
|---|---|---|
| EP | 1283146 A2 | 2/2003 |
| EP | 2033875 A2 | 3/2009 |
| FR | 2779695 A1 | 12/1999 |
| FR | 2861657 A1 | 5/2005 |
| JP | 2007145146 A | 6/2007 |
| WO | 2003020572 A1 | 3/2003 |
| WO | 2017060149 A1 | 4/2017 |
| WO | 2017067721 A1 | 4/2017 |

\* cited by examiner

STOWABLE STEERING WHEEL ASSEMBLY

CROSS REFERENCE TO RELATED APPLICATION

This application claims the benefit of U.S. Provisional Application No. 62/396,316, filed on Sep. 19, 2016, the contents of which are incorporated herein by reference thereto.

FIELD

The present application relates generally to steering wheel assemblies and, more particularly, to a steering wheel assembly selectively stowable within an instrument panel of a vehicle.

BACKGROUND

Conventional steering assemblies are configured to change the driving direction of a vehicle when a driver rotates the steering wheel in a particular direction. For example, rotation of the steering wheel typically rotates a steering column shaft, which transmits the rotary force through a universal joint to a rack and pinion gear. The rotational motion of the steering column then converted into rectilinear motion and transmitted through a rack bar, tie rod, and tire knuckle to change the driving direction of the vehicle.

With the advent of driverless or autonomous vehicles, steering wheels may needlessly occupy cabin space when a driver is not controlling the vehicle. Moreover, steering wheels may hinder the ingress or egress of a driver when the vehicle is off. Accordingly, while known steering wheel assemblies work for their intended purpose, an improved steering wheel assembly is desirable.

SUMMARY

In accordance with an exemplary aspect of the invention, a steering wheel assembly configured to retract into an instrument panel of a vehicle is provided. The steering wheel assembly includes, in one exemplary implementation, a mounting sled assembly configured to mount to a structural portion of the vehicle, a movable sled assembly operably coupled to the mounting sled assembly and movable relative thereto, the movable sled assembly movable between a retracted position where the movable sled assembly is disposed within the instrument panel, and a deployed position where the movable sled assembly is extended away from the instrument panel toward a rear of the vehicle, and a handle assembly configured to move between a stowed position where the handle assembly is at least partially retracted within the movable sled assembly, and a deployed position where at least a portion of the handle assembly extends outward from the movable sled assembly for a driver to manipulate and steer the vehicle.

In addition to the foregoing, the described steering wheel assembly may include one or more of the following features: a first motor configured to move the movable sled between the retracted position and the deployed position, and a second motor configured to move the handle assembly between the stowed position and the deployed position; a gear rack coupled between the first motor and the movable sled assembly; wherein the gear rack includes a toothed body configured to meshingly engage a gear coupled to the first motor, a plunger coupled to the movable sled assembly, and a pin configured to prevent rotation of the gear rack; and a steering shaft assembly extending at least partially through the mounting sled body and the movable sled body.

In addition to the foregoing, the described steering wheel assembly may include one or more of the following features: wherein the steering shaft assembly includes an outer shaft in telescopic engagement with an inner shaft; a shaft bearing assembly at least partially disposed about the steering shaft assembly; a motor coupled to the movable sled assembly, a ball nut coupled to the shaft bearing assembly, and a ball screw coupled between the motor and the ball nut; first and second shoulder bolts coupled to the shaft bearing assembly, the first shoulder bolt slidably received in first central slot formed in the movable sled assembly, and the second shoulder bolt slidably received in a second central slot formed in the movable sled; and wherein the handle assembly comprises a left handle and a right handle.

In addition to the foregoing, the described steering wheel assembly may include one or more of the following features: wherein each of the left and right handles includes a handle grip portion disposed between an upper arm and a lower arm; wherein each upper arm and lower arm includes a first aperture to receive a pin, and a second aperture to receive a shoulder bolt, wherein each pin is received in a diverging slot formed in the movable sled assembly, and each shoulder bolt is received in a central slot formed in the movable sled assembly; and a first pair of apertures formed in the left handle, with a first aperture in the upper arm and a second aperture in the lower arm of the left handle, and a second pair of apertures formed in the right handle, with a third aperture in the upper arm and a fourth aperture in the lower arm of the right handle.

In addition to the foregoing, the described steering wheel assembly may include one or more of the following features: a first pin disposed in the first aperture, the first pin received in a first diverging slot formed in the movable sled assembly, and a second pin disposed in the second aperture, the second pin received in a second diverging slot formed in the movable sled assembly; a third pin disposed in the third aperture, the third pin received in a third diverging slot formed in the movable sled assembly, and a fourth pin disposed in the fourth aperture, the fourth pin received in a fourth diverging slot formed in the movable sled assembly; a third pair of apertures formed in the left handle, with a fifth aperture in the upper arm and a sixth aperture in the lower arm of the left handle, and a fourth pair of apertures formed in the right handle, with a seventh aperture in the upper arm and an eighth aperture in the lower arm of the right handle; and wherein the third and fourth pair of apertures are aligned and configured to receive a pair of shoulder bolts such that a pivot point is defined between the left and right handles.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 2:
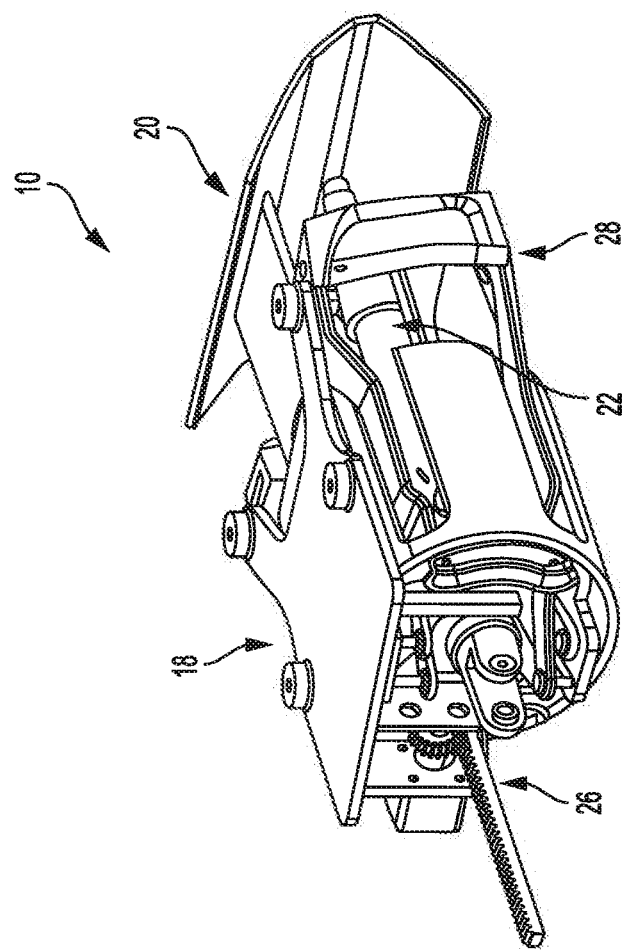
FIG. 2 is a rear perspective view of the steering wheel assembly of FIG. 1 in the stowed position, in accordance with the principles of the present disclosure.
Figure 1:
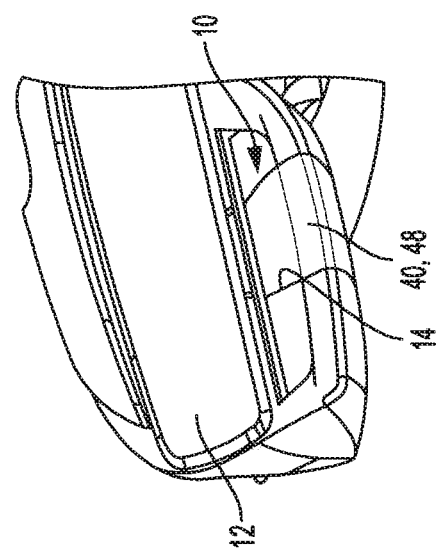
FIG. 1 is a perspective view of an example steering wheel assembly in a stowed position within an instrument panel, in accordance with the principles of the present disclosure.
Figure 3:
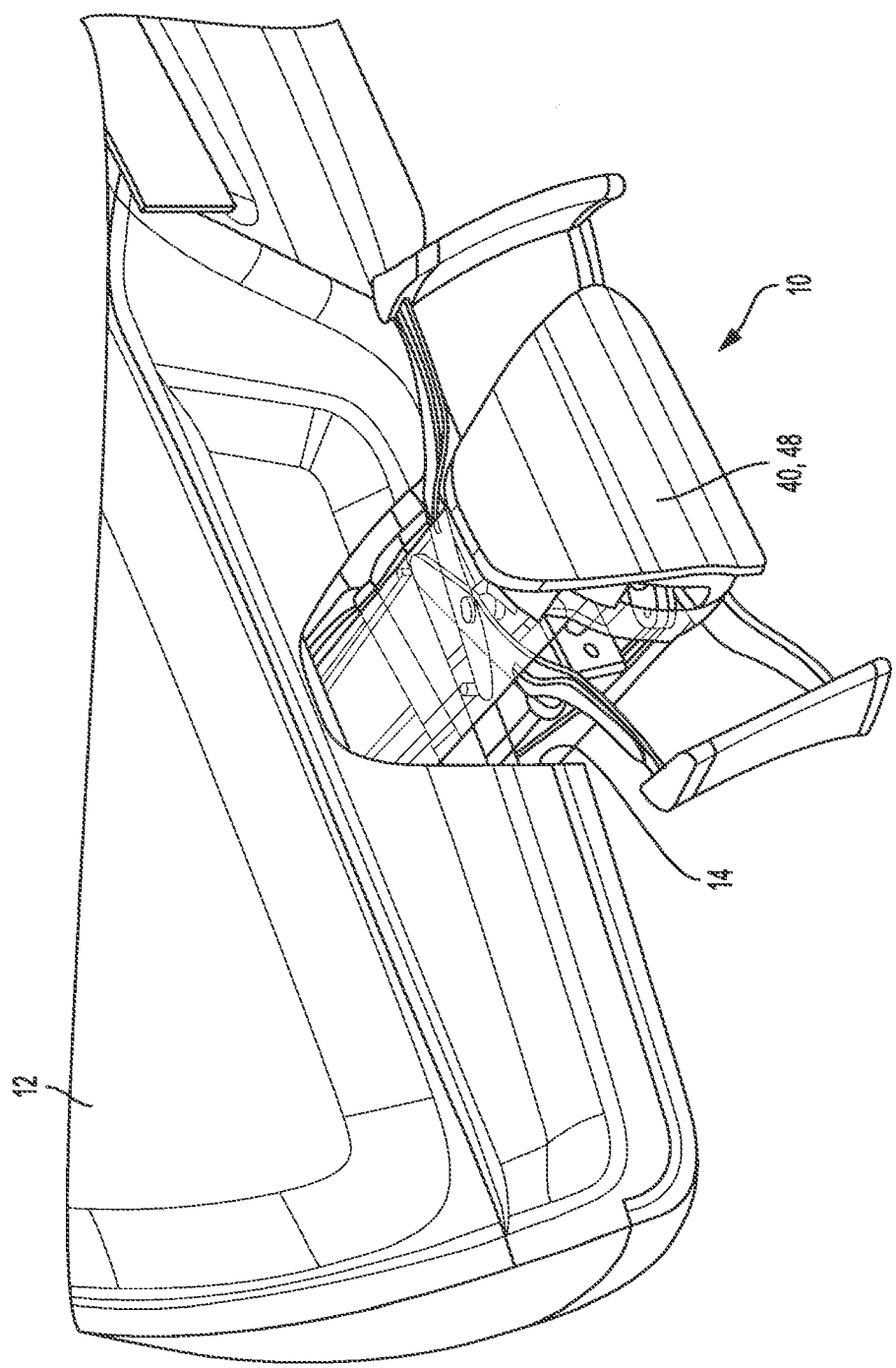
FIG. 3 is a perspective view of the steering wheel assembly shown in FIG. 1 in a deployed position, in accordance with the principles of the present disclosure.
Figure 4:
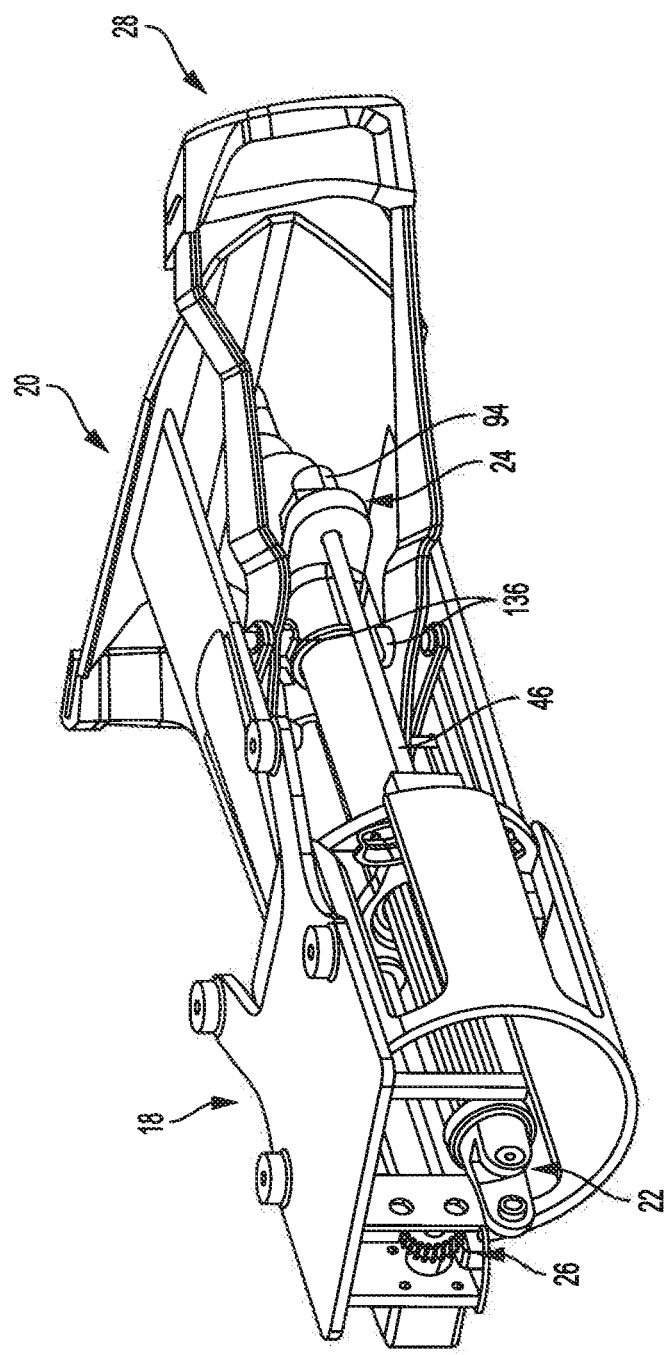
FIG. 4 is a rear perspective view of the steering wheel assembly shown in FIG. 2 in a deployed position, in accordance with the principles of the present disclosure.
Figure 5:
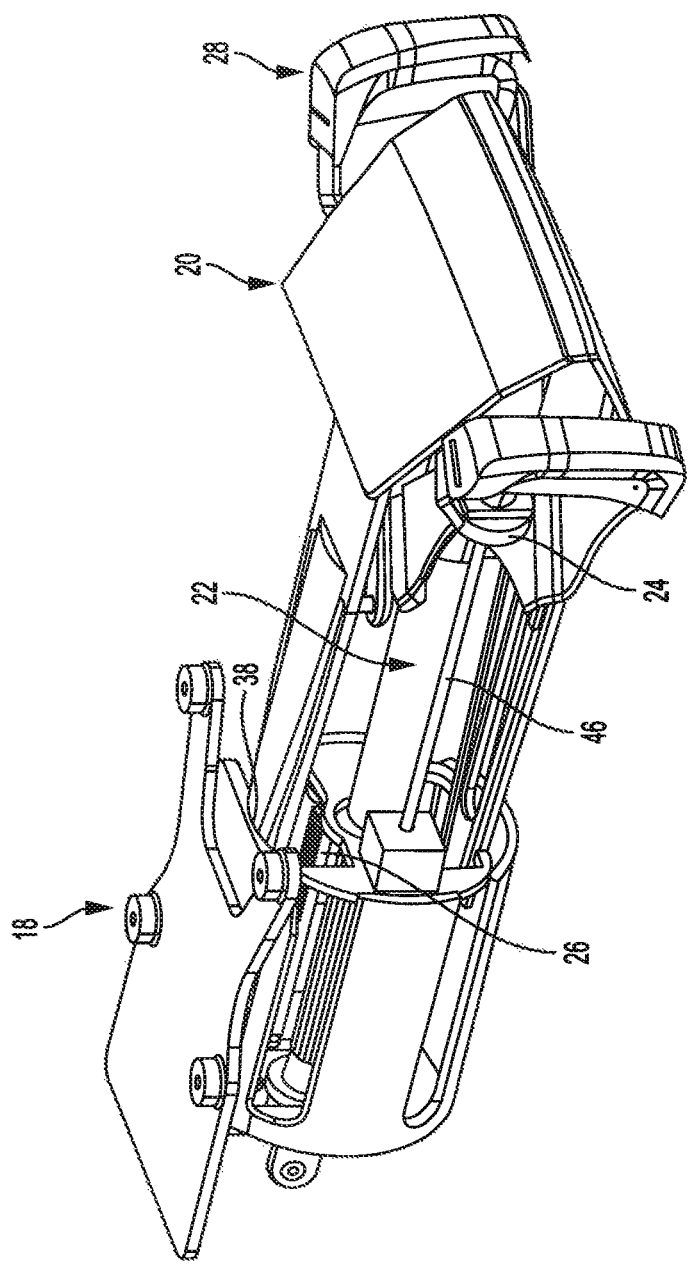
FIG. 5 is a front perspective view of the steering wheel assembly shown in FIG. 4, in accordance with the principles of the present disclosure.

With initial reference to FIGS. 1-5, an example stowable and deployable vehicle steering wheel assembly is illustrated and generally identified at reference numeral 10. Steering wheel assembly 10 is selectively movable between a stowed position (FIGS. 1 and 2) and a deployed position (FIGS. 3-5). As shown in FIG. 1, in the stowed position, steering wheel assembly 10 is retracted into an instrument panel 12 of the vehicle and concealed therein. In the deployed position, a driver may utilize the steering wheel assembly to steer the vehicle.

As illustrated in FIGS. 2, 4 and 5, steering wheel assembly 10 generally includes a mounting sled assembly 18, a movable sled assembly 20, a steering shaft assembly 22, a shaft bearing assembly 24, a gear rack 26, and a handle assembly 28.

Figure 6:
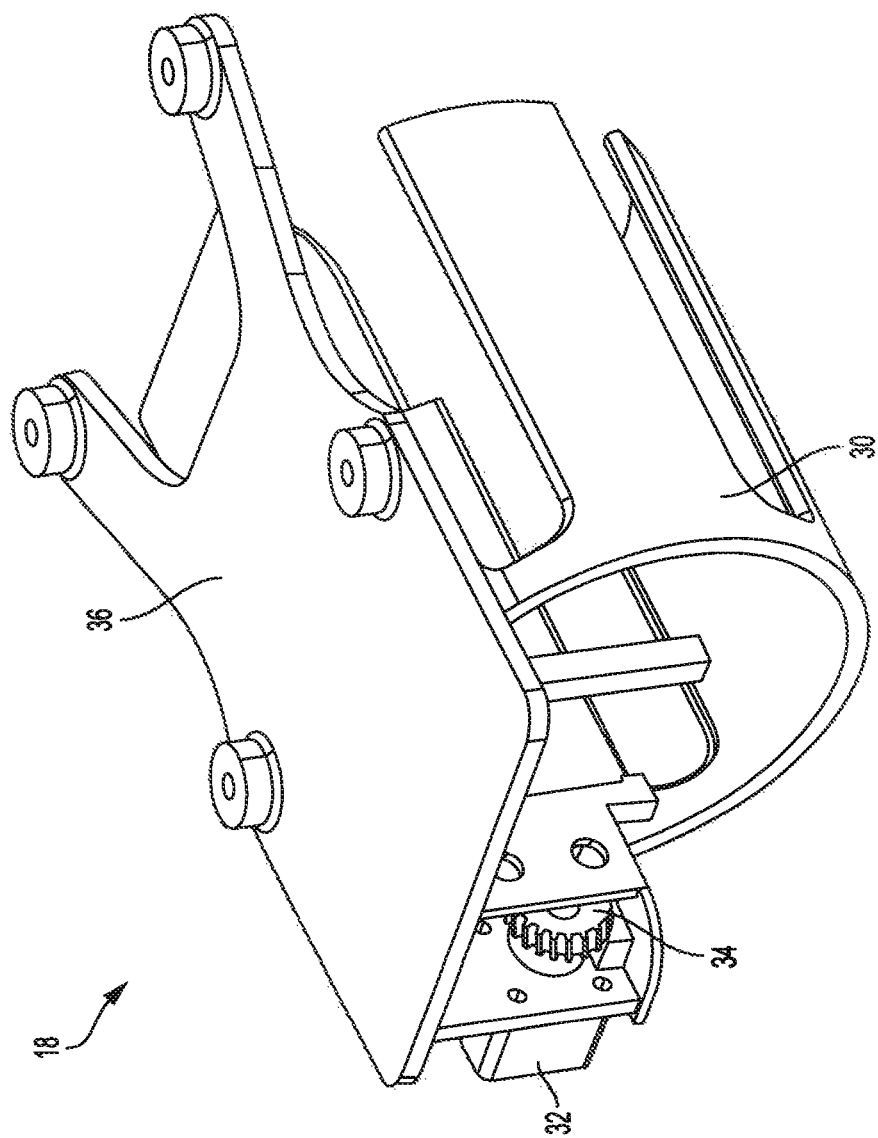
FIG. 6 is a perspective view of an example mounting sled assembly of the steering wheel assembly shown in FIG. 2, in accordance with the principles of the present disclosure.

With additional reference to FIG. 6, mounting sled assembly 18 is described in further detail. In the example embodiment, mounting sled assembly 18 generally includes a mounting sled body 30, a motor 32, and a gear 34. Mounting sled body 30 includes a mounting plate 36 configured to couple to a cross-car beam (not shown) or other structural component of the vehicle. As such, mounting sled body 30 is fixed relative to the vehicle. Motor 32 is coupled to mounting sled body 30 and is configured to selectively rotate gear 34 to selectively retract steering wheel assembly 10 into instrument panel 12, as described herein in more detail.

Additionally, in the example embodiment, a groove 38 (FIG. 5) is formed in an inner wall of mounting sled body 30 and configured to receive a portion of movable sled assembly 20 to automatically rotate the assembly to a center position when retracted into the instrument panel 12. In one example, groove 38 is generally V-shaped and converges as it extends from a rear of the vehicle toward a front of the vehicle.

Figure 7:
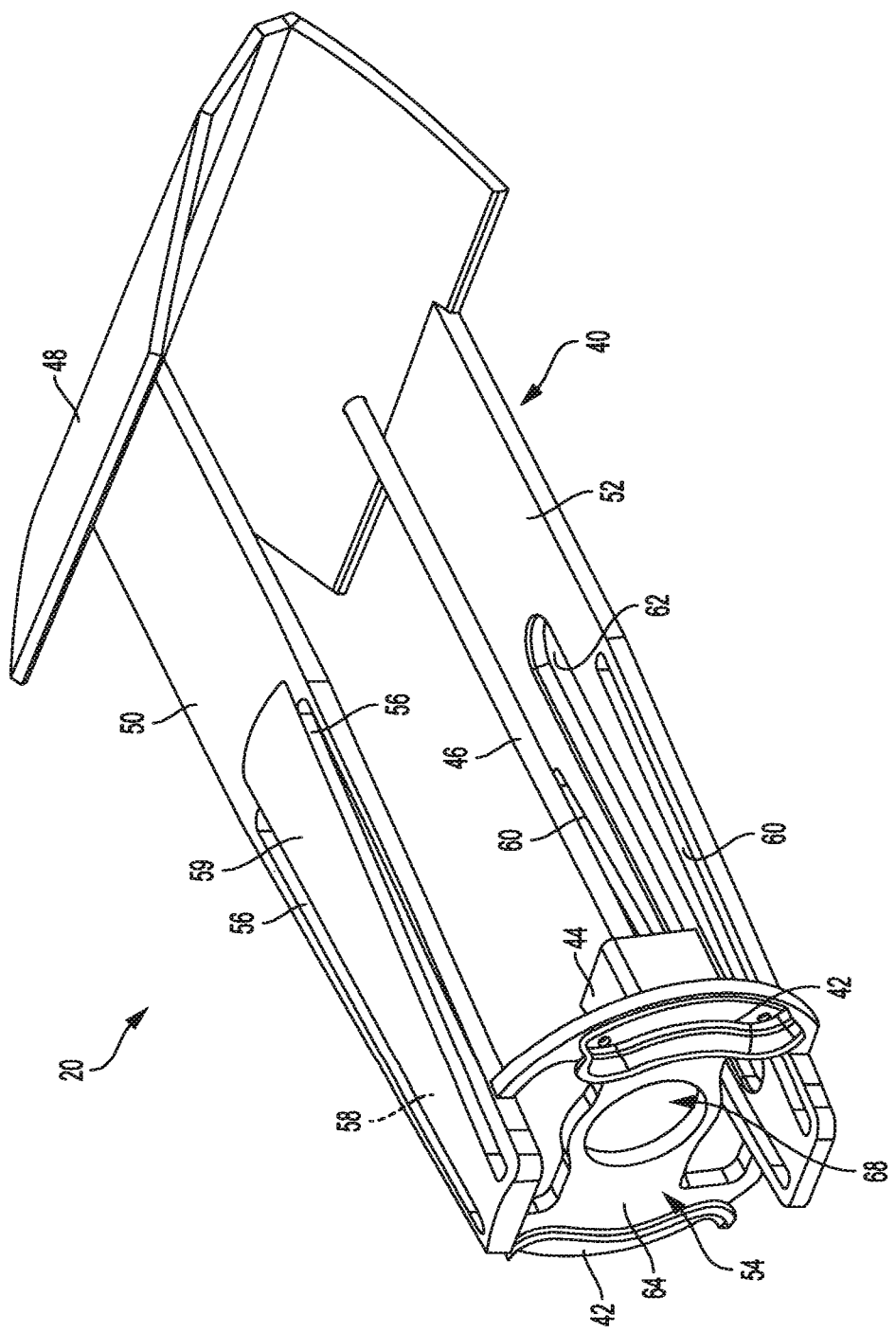
FIG. 7 is a perspective view of an example movable sled assembly of the steering wheel assembly shown in FIG. 2, in accordance with the principles of the present disclosure.

With additional reference to FIG. 7, movable sled assembly 20 is described in more detail. In the example embodiment, movable sled assembly 20 is rotatably mounted within mounting sled assembly 18 and generally includes a movable sled body 40, a pair of retaining plates 42, a motor 44, and a ball screw 46. Sled body 40 includes a horn pad or instrument panel portion 48, an upper support arm 50, a lower support arm 52, and a forward support plate 54. Instrument panel portion 48 is sized and shaped to blend with the contour of instrument panel 12 when steering wheel assembly 10 is in the stowed position (see FIG. 4).

Upper support arm 50 is coupled to and extends between instrument panel portion 48 and forward support plate 54. Upper support arm 50 includes a pair of diverging slots 56 and a central slot 58 disposed between the diverging slots 56 and visible from an underside of upper support arm 50. In one example, central slot 58 is a counterbore formed in the underside of upper support arm 50 but does not extend therethrough. A projection 59 is formed on the upper surface of upper support arm 50 and is configured to be received within the groove 38 formed in mounting sled body 30. In this way, as movable sled assembly 20 is retracted into instrument panel 12, projection 59 is drawn into groove 38 to automatically rotate the movable sled assembly 20 to a central position so the instrument panel portion 48 is properly oriented to fit within a cutout 14 in the instrument panel 12.

Lower support arm 52 is coupled to and extends between instrument panel portion 48 and forward support plate 54. Lower support arm 52 includes a pair of diverging slots 60 and a central slot 62 disposed therebetween. Forward support plate 54 includes a forward face 64, a rear face 66, and defines an aperture 68, which is configured to receive steering shaft assembly 22 therethrough.

Retaining plates 42 are coupled to the forward face 64 of forward support plate 54, and motor 44 is coupled to rear face 66 of forward support plate 54. Motor 44 is configured to selectively drive ball screw 46 to selectively deploy handle assembly 28, as described herein in more detail.

Figure 8:
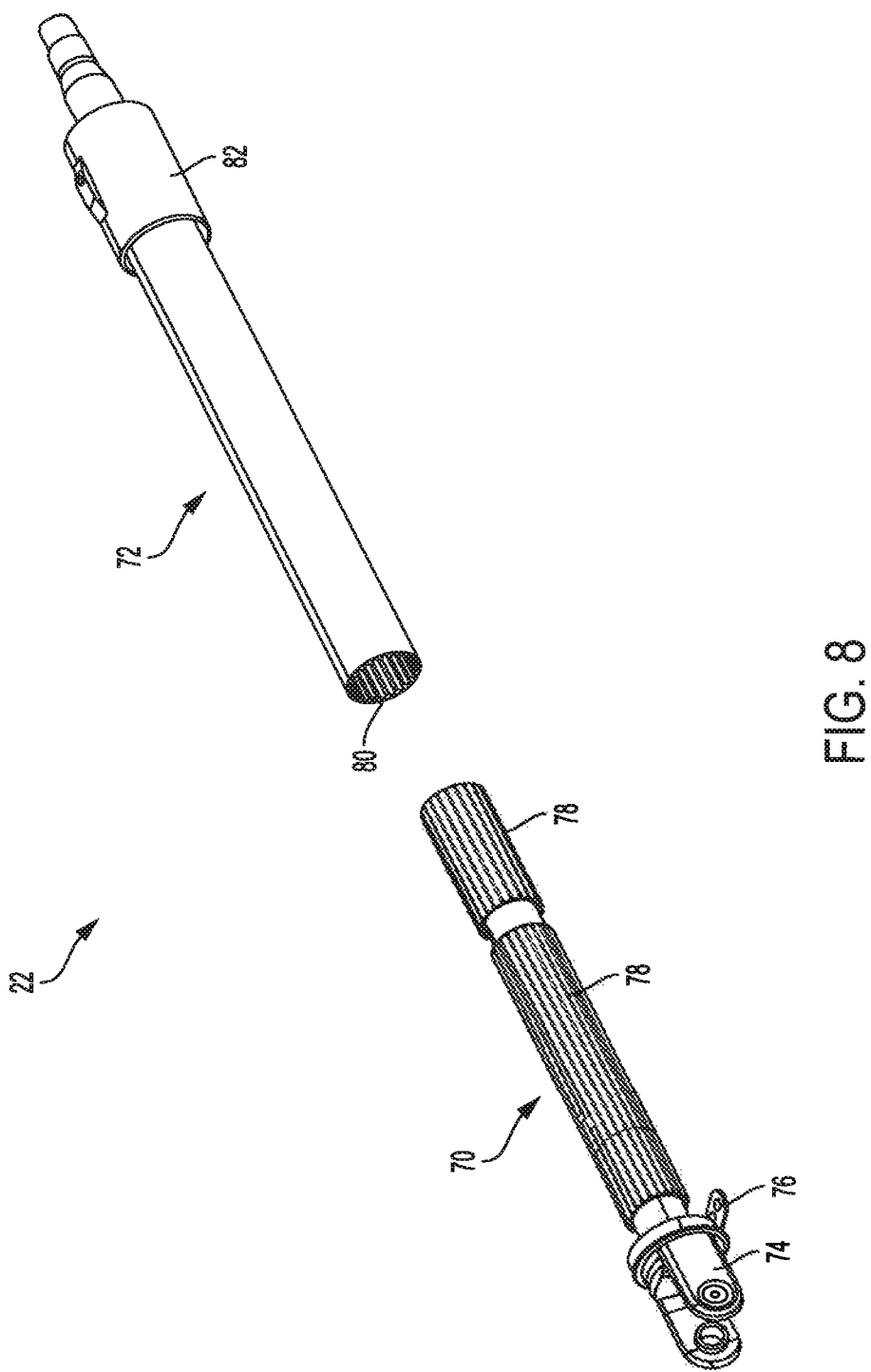
FIG. 8 is a perspective view of an example steering shaft assembly of the steering wheel assembly shown in FIG. 2, in accordance with the principles of the present disclosure.

With additional reference to FIG. 8, steering shaft assembly 22 is described in further detail. In the example embodiment, steering shaft assembly 22 generally includes an inner shaft 70 and an outer shaft 72. Inner shaft 70 includes a yoke 74, a flange 76, and a splined outer diameter or surface 78. Yoke 74 is configured to couple to a vehicle steering system (not shown) for steering the vehicle. Flange 76 is coupled to mounting sled body 30 such that inner shaft 70 is fixed thereto.

Outer shaft 72 includes a splined inner diameter or surface 80 configured to receive and mate with inner shaft splined surface 78. In this way, outer shaft 72 may telescope along inner shaft 70 to move steering wheel assembly 10 between the deployed position (telescoped toward the driver) and the stowed position (telescoped away from the driver). Due to the splined connection therebetween, rotational movement of outer shaft 72 (e.g., via handle assembly 28) transmits rotational movement to inner shaft 70 and to the vehicle steering system (not shown). A sleeve or cover 82 is disposed about outer shaft 72.

Figure 9:
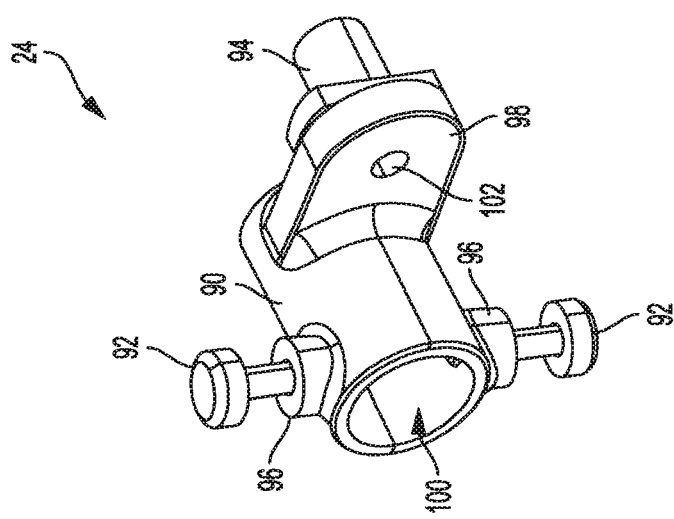
FIG. 9 is a perspective view of an example shaft bearing assembly of the steering wheel assembly shown in FIG. 2, in accordance with the principles of the present disclosure.

With additional reference to FIG. 9, shaft bearing assembly 24 is described in more detail. In the example embodiment, shaft bearing assembly 24 generally includes a main body 90, a pair of shoulder bolts 92, and a ball nut 94 (FIG. 4). In the illustrated example, main body 90 is generally tubular and includes a pair of opposed bosses 96, a flange 98, and an aperture 100. Each boss 96 receives one shoulder bolt 92, and flange 98 includes an aperture 102 configured to receive ball screw 46 therethrough (see FIGS. 4 and 5). Shoulder bolts 92 are received in the upper central slot 58 and the lower central slot 62 of the movable sled assembly 20, and shoulder bolts 92 are configured translate along the opposed central slots 58, 62 to thereby facilitate deploying and retracting the handle assembly 28. Ball nut 94 is coupled to flange 98 and is operably associated with ball screw 46.

Figure 10:
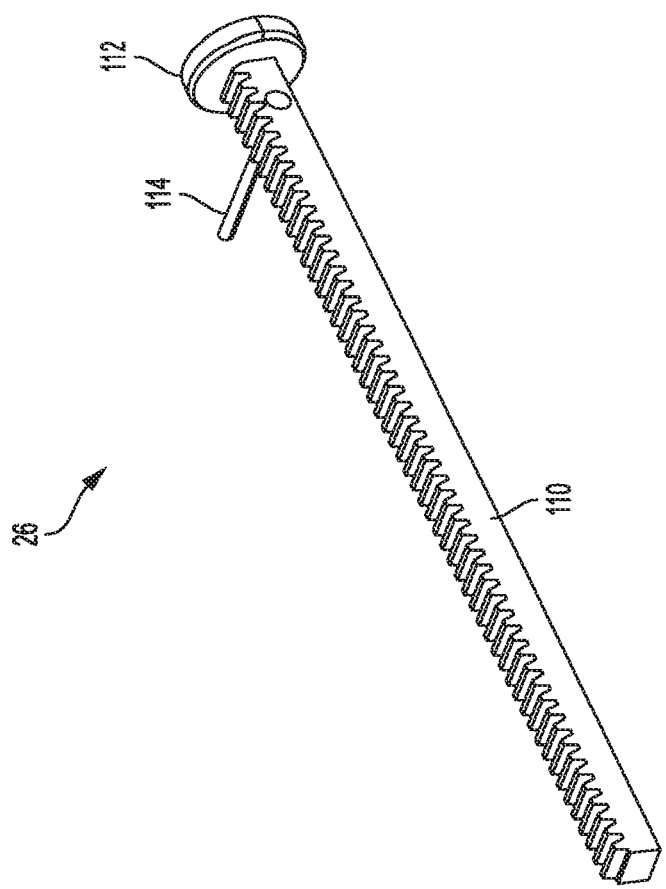
FIG. 10 is a perspective view of an example gear rack of the steering wheel assembly shown in FIG. 2, in accordance with the principles of the present disclosure.

With additional reference to FIG. 10, gear rack 26 is described in further detail. In the example embodiment, gear rack 26 generally includes a toothed body 110, a plunger 112, and a pin 114. Toothed body 110 is configured engage the teeth of gear 34, plunger 112 abuts against or is coupled to retaining plate 42 to facilitate pushing and/or pulling of movable sled assembly 20, and pin 114 is configured to prevent rotation of gear rack 26.

Figure 12:
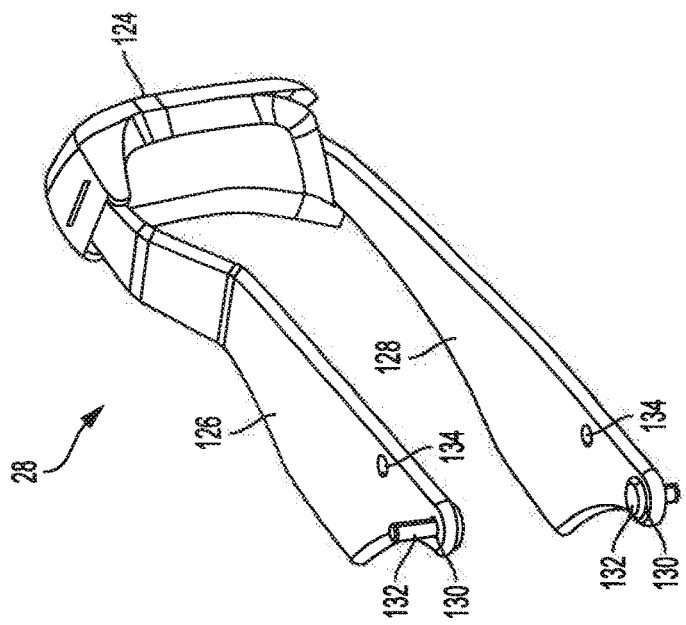
FIG. 12 is a perspective view of an example right handle of the steering wheel assembly shown in FIG. 2, in accordance with the principles of the present disclosure.
Figure 11:
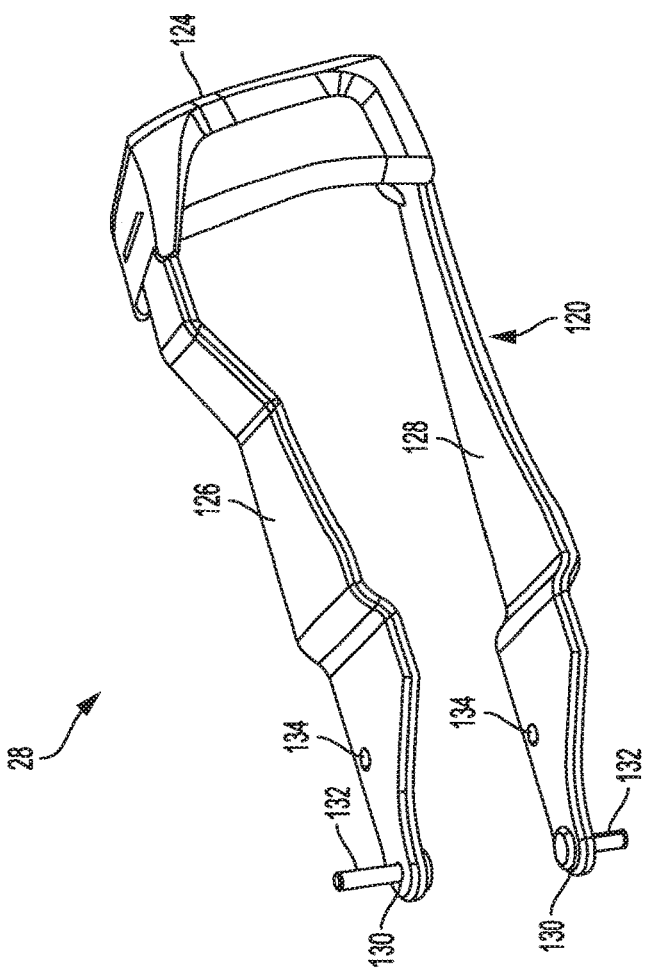
FIG. 11 is a perspective view of an example left handle of the steering wheel assembly shown in FIG. 2, in accordance with the principles of the present disclosure.

With additional reference to FIGS. 11 and 12, handle assembly 28 is described in more detail. In the example embodiment, handle assembly 28 generally includes a left handle 120 and a right handle 122. Each handle 120, 122 includes a handle grip portion 124 and an upper arm 126 and a lower arm 128 extending therefrom. Grip portion 124 is configured to be gripped by a driver's hand for steering of the vehicle. Upper and lower arms 126, 128 each include a first aperture 130 to receive a pin or bolt 132, and a second aperture 134 configured to receive one shoulder bolt 92 therethrough. Each bolt 132 is configured to be received in and translate along one of diverging slots 56, 60. Moreover, when the opposed shoulder bolts 92 are each inserted through a pair of apertures 134, opposed pivot points 136 (FIG. 4) are established for handles 120, 122 such that handle assembly 28 is configured for scissor-like articulation about the pivot point.

In operation, steering wheel assembly 10 may begin in the stowed position shown in FIGS. 1 and 2. For example, the steering wheel assembly 10 may be in the stowed position because the vehicle engine is off or the vehicle is in an autonomous driving mode. The vehicle may then receive a signal to move the steering wheel assembly 10 to the deployed position (FIGS. 3-5). For example, the signal may be generated by the driver pushing a button or making a voice command, or when a vehicle controller determines a predefined condition is satisfied (e.g., the engine is turned on).

Upon receipt of the signal to deploy, motor 32 is energized, which rotates gear 34 and moves gear rack 26 toward the driver. This movement of gear rack 26 toward the driver causes movable sled body 40 to similarly move toward the driver, which telescopes outer shaft 72 toward the driver.

Once movable sled body 40 has translated toward the driver a predetermined distance (e.g., to provide clearance for handle assembly 28), second motor 44 is energized. In some embodiments, motors 32 and 44 may be energized simultaneously. Second motor 44 causes ball screw 46 to rotate within ball nut 94, which drives shaft bearing assembly 24 outward toward the driver. This in turn causes shoulder bolts 92 to slide along the upper and lower central slots 58, 62 toward the driver. During movement along central slots 58, 62, the bolts 132 of respective handles 120, 122 are forced to diverge as they travel along the diverging slots 56, 60. As such, each handle 120, 122 is subsequently articulated outward and extended laterally from behind horn pad 48 to the final deployed position (FIGS. 3-5). The driver is then able to engage grip portions 124 to steer the vehicle.

Motors 32, 44 may be operated in reverse to subsequently move steering wheel assembly 10 from the deployed position to the stowed position.

Described herein are systems and methods for an automatically deployed steering wheel assembly. The steering wheel assembly is conveniently stowed within the vehicle instrument panel when not in use and automatically deployed when desired. The steering wheel assembly generally includes a movable sled assembly that is rotatably mounted within a mounting sled assembly. A handle assembly is nested within the movable sled assembly and is automatically deployed as the movable sled assembly is translated outward from the mounting sled assembly toward the driver. Accordingly, the described system provides increased cabin space for the driver when the steering wheel assembly is not in use.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A steering assembly movable between a deployed position and a stowed position in an instrument panel of a vehicle, the assembly comprising:
    a mounting sled assembly configured to mount to a structural portion of the vehicle;
    a movable sled assembly operably coupled to the mounting sled assembly and movable relative thereto, the movable sled assembly movable between a sled stowed position where the movable sled assembly is disposed within the instrument panel, and a sled deployed position where the movable sled assembly is extended away from the instrument panel toward a rear of the vehicle; and
    a handle assembly operably coupled to the movable sled assembly and configured to move between a handle stowed position where the handle assembly is at least partially retracted within the movable sled assembly, and a handle deployed position where at least a portion of the handle assembly extends outward from the movable sled assembly for a driver to steer the vehicle,
    wherein the handle assembly collapses into the movable sled assembly and the movable sled assembly with the handle assembly collapsed therein retracts into the mounting sled assembly in the instrument panel as the steering assembly moves from the deployed position to the stowed position;
    a first motor configured to move the movable sled assembly between the sled stowed position and the sled deployed position;
    a second motor configured to move the handle assembly between the handle stowed position and the handle deployed position; and
    a gear rack coupled between the first motor and the movable sled assembly, wherein the gear rack includes a toothed body configured to meshingly engage a gear coupled to the first motor, a plunger coupled to the movable sled assembly, and a pin configured to prevent rotation of the gear rack.

2. The steering assembly of claim 1, wherein the movable sled assembly includes an instrument panel portion attached thereto, the instrument panel portion configured to blend with an outer contour of the instrument panel when the steering assembly is in the stowed position.

3. The steering assembly of claim 1, further comprising a steering shaft assembly extending at least partially through a body of the mounting sled assembly and a body of the movable sled assembly.

4. The steering assembly of claim 3, wherein the steering shaft assembly includes an outer shaft in telescopic engagement with an inner shaft.

5. The steering assembly of claim 3, further comprising a shaft bearing assembly at least partially disposed about the steering shaft assembly.

6. The steering assembly of claim 5, further comprising:
a motor coupled to the movable sled assembly;
a ball nut coupled to the shaft bearing assembly; and
a ball screw coupled between the motor and the ball nut.

7. The steering assembly of claim 1, wherein the handle assembly comprises a left handle and a right handle.

8. The steering assembly of claim 7, wherein each of the left and right handles includes a handle grip portion disposed between an upper arm and a lower arm.

9. The steering assembly of claim 8, further comprising:
a first pair of apertures formed in the left handle, with a first aperture in the upper arm and a second aperture in the lower arm of the left handle; and
a second pair of apertures formed in the right handle, with a third aperture in the upper arm and a fourth aperture in the lower arm of the right handle.

10. The steering assembly of claim 9, further comprising:
a first pin disposed in the first aperture, the first pin received in a first diverging slot formed in the movable sled assembly; and
a second pin disposed in the second aperture, the second pin received in a second diverging slot formed in the movable sled assembly.

11. The steering assembly of claim 10, further comprising:
a third pin disposed in the third aperture, the third pin received in a third diverging slot formed in the movable sled assembly; and
a fourth pin disposed in the fourth aperture, the fourth pin received in a fourth diverging slot formed in the movable sled assembly.

12. The steering assembly of claim 11, further comprising:
a third pair of apertures formed in the left handle, with a fifth aperture in the upper arm and a sixth aperture in the lower arm of the left handle; and
a fourth pair of apertures formed in the right handle, with a seventh aperture in the upper arm and an eighth aperture in the lower arm of the right handle.

13. The steering assembly of claim 12, wherein the third and fourth pair of apertures are aligned and configured to receive a pair of shoulder bolts such that a pivot point is defined between the left and right handles.

14. A steering assembly movable between a deployed position and a stowed position in an instrument panel of a vehicle, the assembly comprising:
a mounting sled assembly configured to mount to a structural portion of the vehicle;
a movable sled assembly operably coupled to the mounting sled assembly and movable relative thereto, the movable sled assembly movable between a sled stowed position where the movable sled assembly is disposed within the instrument panel, and a sled deployed position where the movable sled assembly is extended away from the instrument panel toward a rear of the vehicle;
a handle assembly operably coupled to the movable sled assembly and configured to move between a handle stowed position where the handle assembly is at least partially retracted within the movable sled assembly, and a handle deployed position where at least a portion of the handle assembly extends outward from the movable sled assembly for a driver to steer the vehicle,
wherein the handle assembly collapses into the movable sled assembly and the movable sled assembly with the handle assembly collapsed therein retracts into the mounting sled assembly in the instrument panel as the steering assembly moves from the deployed position to the stowed position;
a steering shaft assembly extending at least partially through a body of the mounting sled assembly and a body of the movable sled assembly;
a shaft bearing assembly at least partially disposed about the steering shaft assembly; and
first and second shoulder bolts coupled to the shaft bearing assembly, the first shoulder bolt slidably received in a first central slot formed in the movable sled assembly, and the second shoulder bolt slidably received in a second central slot formed in the movable sled.

15. A steering assembly movable between a deployed position and a stowed position in an instrument panel of a vehicle, the assembly comprising:
a mounting sled assembly configured to mount to a structural portion of the vehicle;
a movable sled assembly operably coupled to the mounting sled assembly and movable relative thereto, the movable sled assembly movable between a sled stowed position where the movable sled assembly is disposed within the instrument panel, and a sled deployed position where the movable sled assembly is extended away from the instrument panel toward a rear of the vehicle; and
a handle assembly operably coupled to the movable sled assembly and configured to move between a handle stowed position where the handle assembly is at least partially retracted within the movable sled assembly, and a handle deployed position where at least a portion of the handle assembly extends outward from the movable sled assembly for a driver to steer the vehicle,
wherein the handle assembly collapses into the movable sled assembly and the movable sled assembly with the handle assembly collapsed therein retracts into the mounting sled assembly in the instrument panel as the steering assembly moves from the deployed position to the stowed position,
wherein the handle assembly comprises a left handle and a right handle,
wherein each of the left and right handles includes a handle grip portion disposed between an upper arm and a lower arm,
wherein each upper arm and lower arm includes a first aperture to receive a pin, and a second aperture to receive a shoulder bolt, and
wherein each pin is received in a diverging slot formed in the movable sled assembly, and each shoulder bolt is received in a central slot formed in the movable sled assembly.

* * * * *